(12) United States Patent
Kim et al.

(10) Patent No.: US 9,155,028 B2
(45) Date of Patent: Oct. 6, 2015

(54) APPARATUS AND METHOD FOR SCANNING NETWORK IN A MOBILE COMMUNICATION TERMINAL

(75) Inventors: Noh-Sun Kim, Seoul (KR); Jung-Min Oh, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 645 days.

(21) Appl. No.: 12/644,182

(22) Filed: Dec. 22, 2009

(65) Prior Publication Data

US 2010/0167729 A1  Jul. 1, 2010

(30) Foreign Application Priority Data

Dec. 30, 2008 (KR) .................. 10-2008-0136439

(51) Int. Cl.
| | | |
|---|---|---|
| *H04W 48/16* | (2009.01) | |
| *H04W 48/18* | (2009.01) | |
| *H04W 48/20* | (2009.01) | |
| *H04W 8/18* | (2009.01) | |
| *H04W 60/00* | (2009.01) | |

(52) U.S. Cl.
CPC .............. *H04W 48/16* (2013.01); *H04W 48/18* (2013.01); *H04W 8/183* (2013.01); *H04W 48/20* (2013.01); *H04W 60/00* (2013.01); *Y02B 60/50* (2013.01)

(58) Field of Classification Search
CPC . H04W 52/0209; H04W 60/02; H04W 60/04; H04W 88/06; H04W 84/042; H04W 84/045
USPC ............ 455/411, 432.1, 435.1, 435.2, 435.3, 455/455, 574, 434, 436, 422.1, 558, 433, 455/552.1, 553.1; 370/328, 338
See application file for complete search history.

(56) References Cited

U.S. PATENT DOCUMENTS

| | | | | |
|---|---|---|---|---|
| 5,839,069 | A  * | 11/1998 | Keshavachar et al. | ......... 455/437 |
| 5,937,351 | A  * | 8/1999 | Seekins et al. | ................ 455/434 |
| 6,175,733 | B1 * | 1/2001 | Seekins et al. | ................ 455/434 |
| 6,992,993 | B1 | 1/2006 | Park et al. | |

(Continued)

FOREIGN PATENT DOCUMENTS

| | | |
|---|---|---|
| KR | 10-2004-0068759 A | 8/2004 |
| KR | 10-2004-0096741 A | 11/2004 |

(Continued)

OTHER PUBLICATIONS

3GPP TS 22.011 V8.4.1 3rd Generation Partnership Project, Technical Specification Group Services and System Aspects, Service accessibility (Release 8); Published Jun. 2008.*

(Continued)

*Primary Examiner* — Nalini Mummalaneni (74) *Attorney, Agent, or Firm* — Cha & Reiter, LLC.

(57) ABSTRACT

An apparatus and a method for scanning a network in a mobile communication terminal are provided. The method for scanning a network in a mobile communication terminal includes to configure a PLMN list based on a Subscriber Identification Module (SIM) card, to store scanned frequency information and corresponding PLMN information into a database by a previous scanning result, to compare the database with the PLMN list and to perform a scanning corresponding to frequency bandwidths included in the database or performing a scanning entire frequency bandwidths according to a result of comparison.

12 Claims, 7 Drawing Sheets

(56) References Cited

U.S. PATENT DOCUMENTS

| | | | |
|---|---|---|---|
| 2004/0224689 A1* | 11/2004 | Raghuram et al. | 455/435.3 |
| 2004/0224716 A1 | 11/2004 | Choi | |
| 2005/0227720 A1* | 10/2005 | Gunaratnam et al. | 455/510 |
| 2006/0234705 A1* | 10/2006 | Oommen | 455/435.3 |
| 2007/0202875 A1* | 8/2007 | Dorsey et al. | 455/434 |
| 2007/0254646 A1* | 11/2007 | Sokondar | 455/432.1 |

FOREIGN PATENT DOCUMENTS

| | | |
|---|---|---|
| KR | 10-0695828 B1 | 3/2007 |
| KR | 10-2008-0091591 A | 10/2008 |
| WO | WO 2008052123 A1 * | 5/2008 |

OTHER PUBLICATIONS

3GPP TS 23.122 V8.2.0 3rd Generation Partnership Project, Technical Specification Group Core Network and Terminals, Non-Access-Stratum (NAS) functions related to Mobile Station (MS) in idle mode (Release 8); Published Jun. 2008 pp. 14-20.*

3GPP TS 31.102 V8.0.0 3rd Generation Partnership Project, Technical Specification Group Core Network and Terminals; Characteristics of the Universal Subscriber Identity Module (USIM) application (Release 8) Published Dec. 2007.*

* cited by examiner

FIG.7 ial No. 10-2008-0136439, the entire disclosure

APPARATUS AND METHOD FOR SCANNING NETWORK IN A MOBILE COMMUNICATION TERMINAL

CLAIM OF PRIORITY

This application claims the benefit of the earlier filing date, under 35 U.S.C. §119, to that patent application filed in the Korean Intellectual Property Office on Dec. 30, 2008 and assigned Serial No. 10-2008-0136439, the entire disclosure of which is hereby incorporated by reference in its entirety.

BACKGROUND OF THE INVENTION

1. Field of the Invention

The present invention relates to mobile communication terminals, and more particularly an apparatus and a method for determining scanning frequency bandwidths.

2. Description of the Related Art

Figure 1:
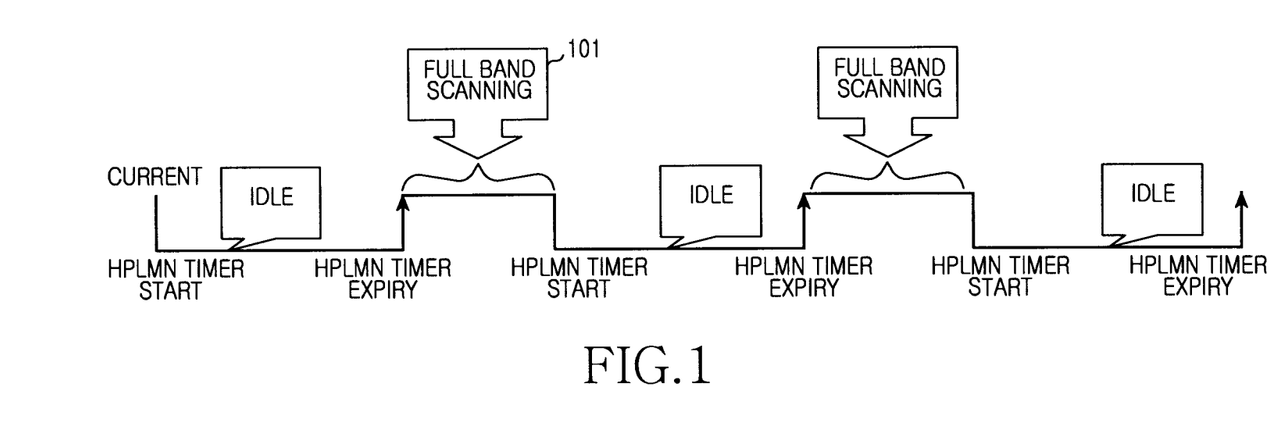
FIG. 1 illustrates a scanning method of a mobile communication terminal in a conventional technology.

Generally, a mobile communication terminal communicates with a network, such as Public Land Mobile Network (hereinafter PLMN), in order to receive a service. Generally, the mobile communication terminal performs a scanning (101) operation of the entire network supporting frequency bandwidths (ranges) for a specific period of time based on a Home PLMN (hereinafter HPLMN) timer to obtain the service when power to the terminal is turned on. FIG. 1 illustrates a typical timing operation when the terminal is powered on to establish communication with the network.

The mobile communication terminal next performs a registration procedure to a highest priority network to which the terminal is connected. In the illustrated example, herein, the HPLMN is a network with the highest priority and the HPLMN is determined by IMSI information that is stored in the Subscriber Information Module (SIM) card of the mobile communication terminal.

The mobile communication terminal considers a registered PLMN as a Visited PLMN (VPLMN) when the mobile communication terminal is registered to a PLMN which is not the HPLMN and the mobile communication terminal performs scanning the frequency ranges of the network in order to find a PLMN with a higher priority than the registered PLMN.

When the mobile communication terminal is registered to a VPLMN and obtains the service, the mobile communication terminal periodically performs a scanning of the available frequency ranges (bandwidths) in order to find the PLMN with a higher priority than the registered VPLMN or the HPLMN. When the mobile communication terminal finds a PLMN with a higher priority, the mobile communication terminal performs a registration to the PLMN with the higher priority.

Typically, a scanning period is stored as an Elementary Files_Higher Priority PLMN (EF_HPPLMN) in the SIM card and the scanning period has a period from 6 minutes, as a minimum value, to 8 hours, as a maximum value.

This, when the mobile communication terminal is registered to the VPLMN, the mobile communication terminal repeatedly performs the scanning operation with a determined period until the mobile communication terminal is registered to the HPLMN.

At this time, the scanning operation is performed across the frequency bandwidths of an entire Radio Access Technology (RAT), which are supported by the mobile communication terminal, in order to find all PLMNs with higher priority than currently registered PLMN.

However, frequency bandwidths which are supported by countries are varying so that frequency bandwidths that the mobile communication terminal should support are increasing in order to provide a seamless service.

According to this, time and quantity of current, which are required for the scanning operation, are increasing due to the need for scanning broader frequency bandwidths in order to find the HPLMN associated with the mobile communication terminal.

Also, when the mobile communication terminal is located in a roaming network, a network operator prefers for the mobile communication terminal to find and be connected to a HPLMN as soon as possible due to a billing and so on. Thus, the network operator has a tendency to configure a scanning period as short as possible.

In this case, because the mobile communication terminal performs the scanning operation more frequently than a normal scanning during an identical period, a power consumption of the mobile communication terminal is increased.

That is, when the mobile communication terminal in a conventional technology obtains a service at the roaming network, a battery life of the mobile communication terminal is shortened due to a increased power consumption caused from the frequent scanning and the time required for the scanning.

SUMMARY OF THE INVENTION

An aspect of the present invention is to provide an apparatus and a method for scanning a network in a mobile communication terminal.

Another aspect of the present invention is to provide an apparatus and a method for performing a scanning frequency operation only for those frequency bandwidths included in a database or performing a scanning all frequency bandwidths by comparing the database that stores frequency information and pre-determined PLMNs with a configured PLMN list from a Subscriber Identification Module (SIM) card in a mobile communication terminal.

In accordance with an aspect of the present invention, an apparatus for scanning for a network in a mobile communication terminal is provided, the apparatus includes a SIM for storing PLMN identifications (IDs) including a HPLMN of the mobile communication terminal, priority information and a pre-determined first scanning period information, a storage unit for storing a configured PLMN list based on the SIM and a database storing frequency information and corresponding PLMN information by a scanning result and a controller for controlling the operation of scanning frequency bandwidths only included in the database or to perform a scanning operation of all frequency bandwidths according to a result of comparing the PLMN list with the database.

In accordance with another aspect of the present invention, a method for scanning a network in a mobile communication terminal is provided, the method includes configuring a PLMN list based on a Subscriber Identification Module (SIM) card, storing scanned frequency information and corresponding PLMN information into a database of a previous scanning result, comparing the database with the PLMN list and performing a scanning operation corresponding to only frequency bandwidths included in the database or performing a scanning operation of an all frequency bandwidths according to a result of comparison with the database.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary aspects, features and advantages of certain exemplary embodiments the present invention will become more apparent from the following detailed description taken in conjunction with the accompanying drawings, in which.

Throughout the drawings, like reference numerals will be understood to refer to like parts, components and structures

DETAILED DESCRIPTION

The following description, with reference to the accompanying drawings, is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions may be omitted for clarity and conciseness so as not to obscure appreciation of the subject matter of the present invention by a person of ordinary skill in the art.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Hereinafter, an apparatus and a method for scanning a network in a mobile communication terminal will be described. The present invention compares a pre-determined Public Land Mobile Networks (PLMNs) with PLMNs from a PLMN list configured from a database, which stores frequency information, and compares the pre-determined Public Land Mobile Networks (PLMNs) with PLMNs from a PLMN list configured from a Subscriber Identifier Module (SIM) card in a mobile communication terminal.

The present invention performs a scanning for frequency bandwidths included in the database or performs a scanning of the entire frequency according to the comparison result.

Herein, the database denotes a database that stores frequency bandwidths information and PLMN ID information. Herein, the mobile communication terminal performs the scanning and found frequency bandwidths and the mobile communication terminal performs a synchronization process for the found frequency bandwidths and determines whether the found frequency bandwidths to be valid or not. When the found frequency bandwidths are determined to be valid, the mobile communication terminal stores information for the valid found frequency bandwidths. The valid frequency bandwidth information is that frequency bandwidth information stored to the database. The PLMN list includes a HPLMN of the mobile communication terminal and denotes a priority for each PLMN.

Figure 2:
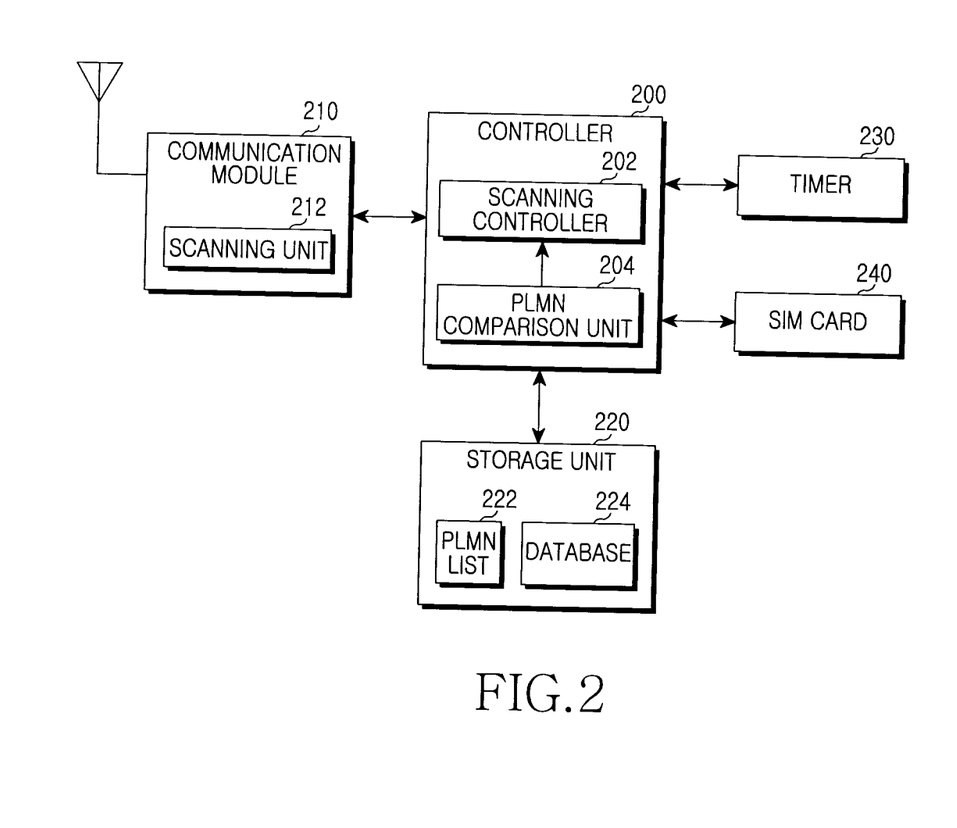
FIG. 2 illustrates a block diagram of a mobile communication terminal according to an exemplary embodiment of the present invention.

FIG. 2 illustrates a block diagram of a mobile communication terminal according to an exemplary embodiment of the present invention.

As illustrated, the mobile communication terminal comprises a controller 200, a communication module 210, a storage unit 220, a timer 230 and a SIM card 240. The controller 200 further includes a scanning controller 202 and a PLMN comparison unit 204 and the communication module 210 further includes a scanning unit 212 and the storage unit 220 further includes a PLMN list 222 and a database 224 according to the exemplary embodiments of the present invention.

Referring to FIG. 2, the controller 200 controls the general operations of the mobile communication terminal. For example, the controller 200 compares the contents of the PLMN list 222 with the contents of a PLMN list in the database 224 and determines frequency bandwidths to scan when the mobile communication terminal is registered to a VPLMN.

That is, when the mobile communication terminal is registered not to a HPLMN but to another PLMN such as a VPLMN, the controller 220 compares the PLMN list 222 with the PLMN list in the database 224 through the PLMN comparison unit 204 and determines whether PLMNs included in the PLMN list 222 are to be included in the database 224.

The controller 220 next determines frequency bandwidths to scan and provides the determined frequency bandwidths to the communication module 210 through the scanning controlling unit 202 according to the comparison result.

That is, the scanning controlling unit 202 determines whether to perform a scanning operation for the frequency bandwidths stored in the database 224 when all the PLMNs included in the PLMN list 222 are included in the database 224.

Meanwhile, the scanning controlling unit 202 performs a scanning operation for frequency bandwidths except those frequency bandwidths for which a scanning operation has been performed before out of all frequency bandwidths after a scanning for the frequency bandwidths stored in the database 224 when all the PLMNs included in the PLMN list 222 are not included in the database 224, i.e. when some PLMNs included in the PLMN list 222 are included in the database 224.

Also, when the mobile communication terminal is registered to a VPLMN, the controller 200 starts the timer 230 after adjusting a determination time of the timer 230 and the controller 200 controls a scanning function for the determined frequency bandwidths before the determination time expires.

The controller 200 restarts the timer 230 when valid PLMNs, which have a higher priority than a priority of the currently registered VPLMN, are not found during the scanning operation.

That is, controller 200 determines an EF_Higher Priority PLMN (EF_HPPLMN) scan period stored in the SIM card 240 and adjusts the determination time of the timer 230. The determination time of the timer 230 may be set between desired minimum and maximum time periods. For example, the time may be set to 6 minutes, as a minimum value, up to 8 hours, as a maximum value. In addition, the determination time may be set in increments of a known duration, e.g., 6 minutes.

The communication module 210 performs a transmitting/receiving operation for the mobile communication terminal to obtain a service as determined by the controller 200. Especially, the communication module 210 performs a scanning operation for scanning a network for a specific period by the scanning unit 212 under the control of the controller 200.

The storage unit 220 stores programs, for a general operation of the mobile communication terminal, and data, especially stores the PLMN list 222 and the database 224 according to the present invention.

The PLMN list 222 comprises PLMNs stored in the SIM card 240 of the mobile communication terminal which is accessed by the controller 200 and includes the HPLMN of the mobile communication terminal. The PLMN list 222 further denotes the priority for each PLMN.

The database 224 stores frequency bandwidth information and corresponding PLMN ID information. The mobile communication terminal performs a scanning and a synchronization operation for the scanned frequency bandwidths and determines whether the scanned frequency bandwidths tare valid under the control of the controller 200. The frequency bandwidth information denotes information regarding the valid frequency bandwidths.

The timer 230 determines a specific time under the control of the controller 200. The timer 230 may determines a period for scanning a network according to the present invention.

The SIM card 240 is a card which stores information regarding the user and includes a micro-processor and a memory chip in the SIM card 240. The SIM 240 may be attached to, or be detached, from the mobile communication terminal.

The SIM card 240 includes PLMN IDs, which includes an HPLMN for the mobile communication terminal, and priority information regarding other PLMNs. Furthermore, stores scanning period information for scanning the network.

Figure 3:
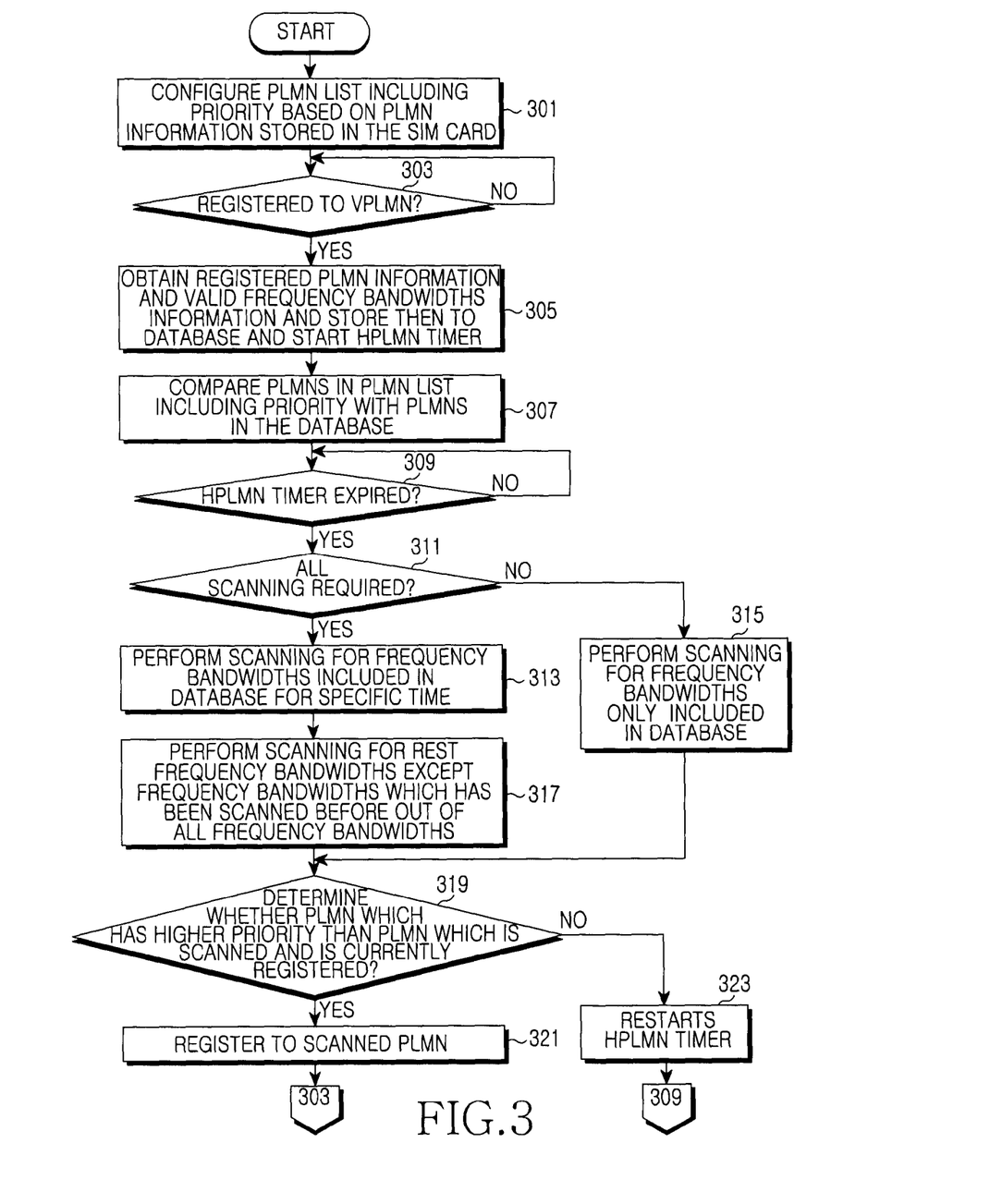
FIG. 3 illustrates a procedure for performing a scanning operation in a mobile communication terminal according to an exemplary embodiment of the present invention.

FIG. 3 illustrates a procedure for performing a scanning in a mobile communication terminal according to an exemplary embodiment of the present invention.

Referring to FIG. 3, the mobile communication terminal configures a PLMN list including a priority for each PLMN based on PLMN information stored in the SIM card in step 301.

The PLMN list includes a HPLMN of the mobile communication terminal and the HPLMN has a highest priority.

The mobile communication terminal determines whether the mobile communication terminal is to be registered to a VPLMN in step 303. When the mobile communication terminal is registered to the VPLMN, the mobile communication terminal stores the registered PLMN information, which comprise at least, a PLMN ID and valid frequency bandwidths information, in database 224 and starts a HPLMN timer which determines a scanning period for scanning the network in step 305.

Herein, the HPLMN timer is configured to perform a scanning for an EF_HPPLMN period, which is stored in the SIM card 240, and the HPLMN timer may be configured to have a first known period as a minimum period and second known period, as a maximum period.

The mobile communication terminal compares PLMNs in the PLMN list, which includes the priority for each PLMN, with PLMNs in the database 224 in step 307. That is, the mobile communication terminal determines whether all PLMNs included in the PLMN list are to be included in the database 224.

The mobile communication terminal determines whether the HPLMN timer has expired in step 309. When the HPLMN timer has expired, the mobile communication terminal determines a scanning period for scanning the network and the mobile communication terminal determines whether scanning of the all frequency bandwidths is required based on a comparison result of the PLMNs in the PLMN list and the PLMNs in the database 224 in step 311.

The mobile communication terminal determines whether the scanning of the all frequency bandwidths, which the mobile communication terminal supports, is required.

When all the PLMNs included in the PLMN list are already included in the database 224, the mobile communication terminal determines no scanning is required and the mobile communication terminal performs a scanning for the frequency bandwidths included in the database 224 in step 315 and proceeds to step 319.

However when some of the PLMNs included in the PLMN list are not included in database 224, i.e., when some PLMNs included in the PLMN list 222 are included in the database 224, the mobile communication terminal performs a scanning for those frequency bandwidths included in the database 224, for a specific time, in step 313.

The mobile communication terminal performs a scanning operation for the remaining frequency bandwidths that were not scanned in step 313 in step 317.

The mobile communication terminal determines whether a PLMN has a higher priority than a PLMN that had been scanned and is currently registered in step 319.

When the PLMN, which has the higher priority than the PLMN that had been scanned and is currently registered, is determined, the mobile communication terminal performs a procedure to register the scanned PLMN in step 321. The mobile communication terminal returns to step 303 and performs following steps again.

Meanwhile, when the PLMN that has the higher priority than the PLMN, which is currently registered, is not determined, the mobile communication terminal restarts the HPLMN timer in step 323 and returns to step 303 and performs illustrated steps again.

Figure 4:
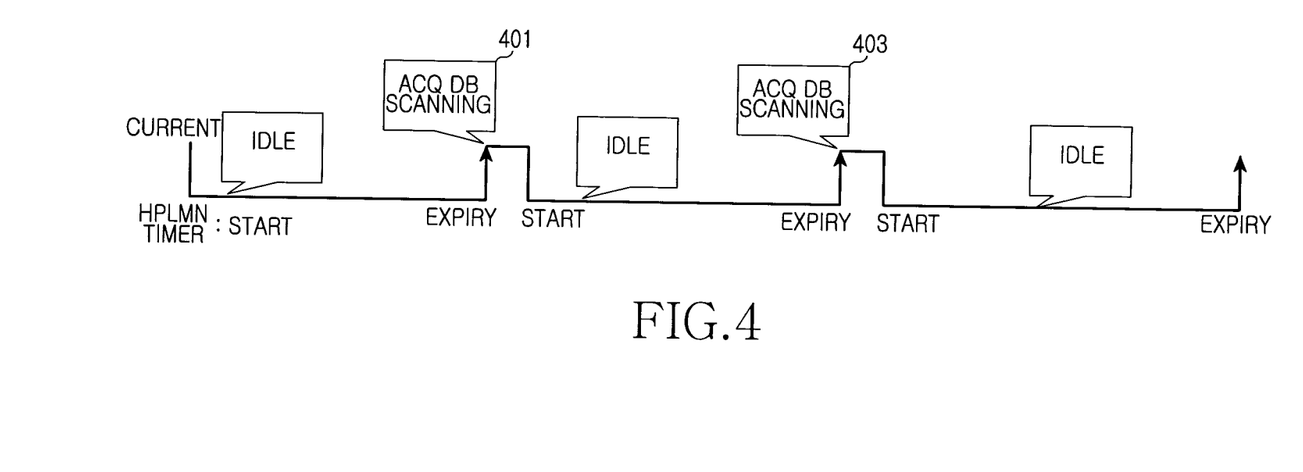
FIG. 4 illustrates a scanning method in a mobile communication terminal according to an exemplary embodiment of the present invention.
Figure 5:
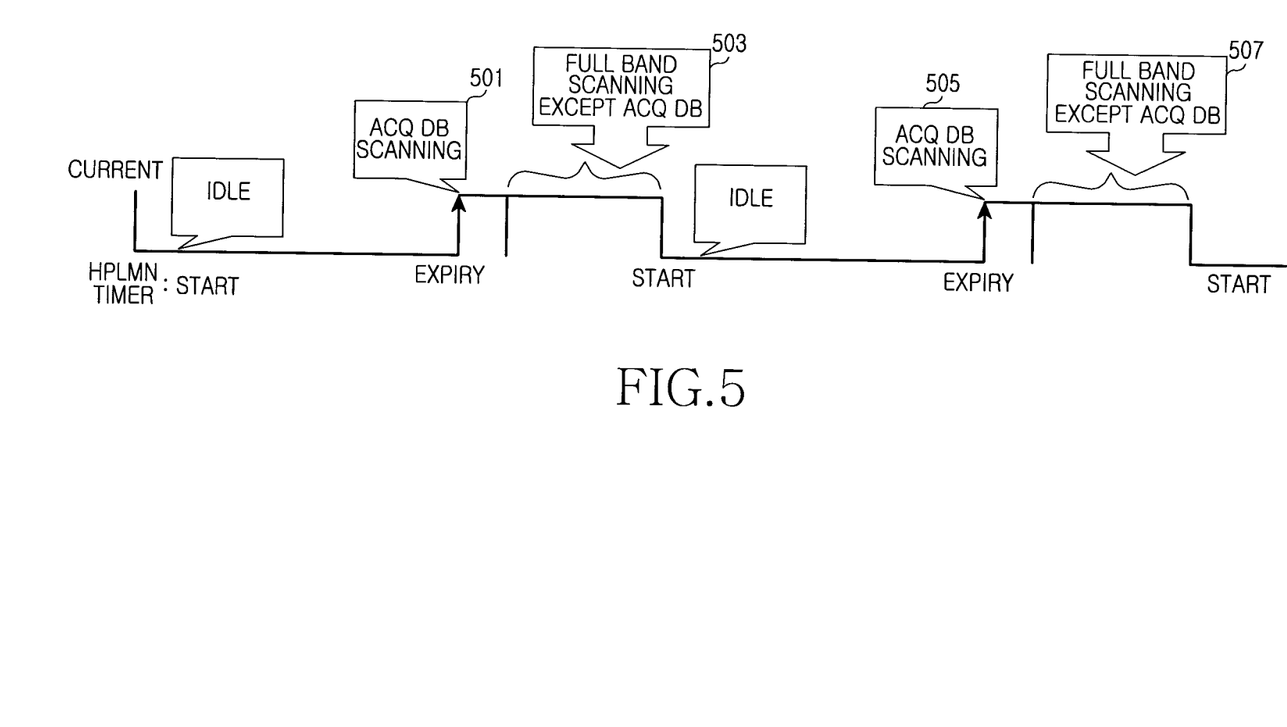
FIG. 5 illustrates a scanning method in a mobile communication terminal according to another exemplary embodiment of the present invention.

The scanning method of the present invention is disclosed in further detail with reference to FIG. 4 and FIG. 5.

The mobile communication terminal configures a PLMN list that represents a priority of each PLMN based on the SIM card. When the mobile communication terminal is registered to a PLMN, the mobile communication terminal stores an identification (ID) of the registered PLMN and frequency information in a database. When the PLMN to which the mobile communication terminal is registered is a VPLMN, the mobile communication terminal compares PLMNs in the PLMN list with PLMNs in the database.

When all the PLMNs in the PLMN list are already included in the database, the mobile communication terminal performs a scanning operation (401, 403, FIG. 4) for only frequency bandwidths included in the database (ACQ DB) per a specific period based on the HPLMN timer as illustrated in FIG. 4.

When all the PLMNs in the PLMN list are not included in the database, the mobile communication terminal performs a scanning (501, 503, FIG. 5) for frequency bandwidths included in the database (ACQ DB) per a specific period based on the PLMN timer as illustrated in FIG. 5.

The mobile communication terminal then performs a scanning (503, 507, FIG. 5) for the remaining frequency bandwidths except the frequency bandwidths scanned by using the database s which the mobile communication terminal supports.

The scanning operation is performed repeatedly per the specific period based on HPLMN timer until a higher PLMN than a PLMN, which the mobile communication terminal is currently registered to, is scanned.

The specific period denotes an EF_HPPLMN time stored in the SIM card and the specific period may have a period from, for example, 6 minutes, as a minimum value, to 8 hours, as a maximum value.

The mobile communication terminal may perform a scanning operation periodically for the all frequency bandwidths when the mobile communication terminal performs a scanning operation (401, 403) for the frequency bandwidths included in the database as illustrated in FIG. 4 in the present invention.

Figure 6:
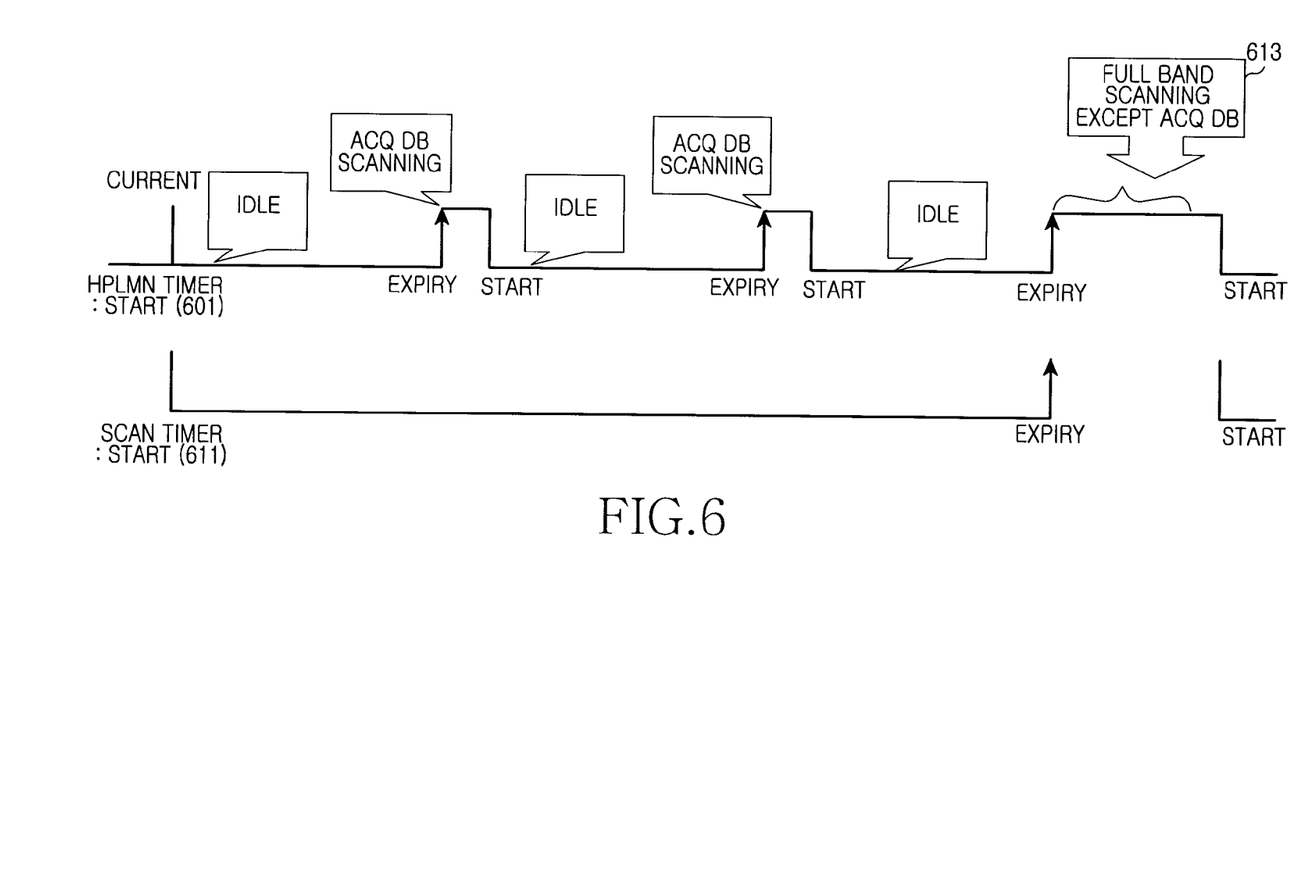
FIG. 6 illustrates a scanning method in a mobile communication terminal according to yet another exemplary embodiment of the present invention; and, FIG. 7 illustrates a scanning method in a mobile communication terminal according to still another exemplary embodiment of the present invention.

That is, in the present invention, as illustrated in FIG. 6, a scan time 611 may be used in addition to the HPLMN timer 601 for a primary scanning.

The database may be updated by a scanning for the all frequency bandwidths (613) and the mobile communication terminal may scan a high priority PLMN list whenever the scan timer 611 expires in the present invention.

When the specific period which the mobile communication terminal performs the scanning operation, that is, a determination time of the HPLMN timer is longer than a threshold, the mobile communication terminal may perform the scanning operation for a period, which is shorter than the threshold, for the frequency bandwidths included in the database or for the frequency bandwidths included in the database and the all frequency bandwidths based on the comparison result between the PLMNs included in the PLMN list and the PLMNs included in the database.

Figure 7:
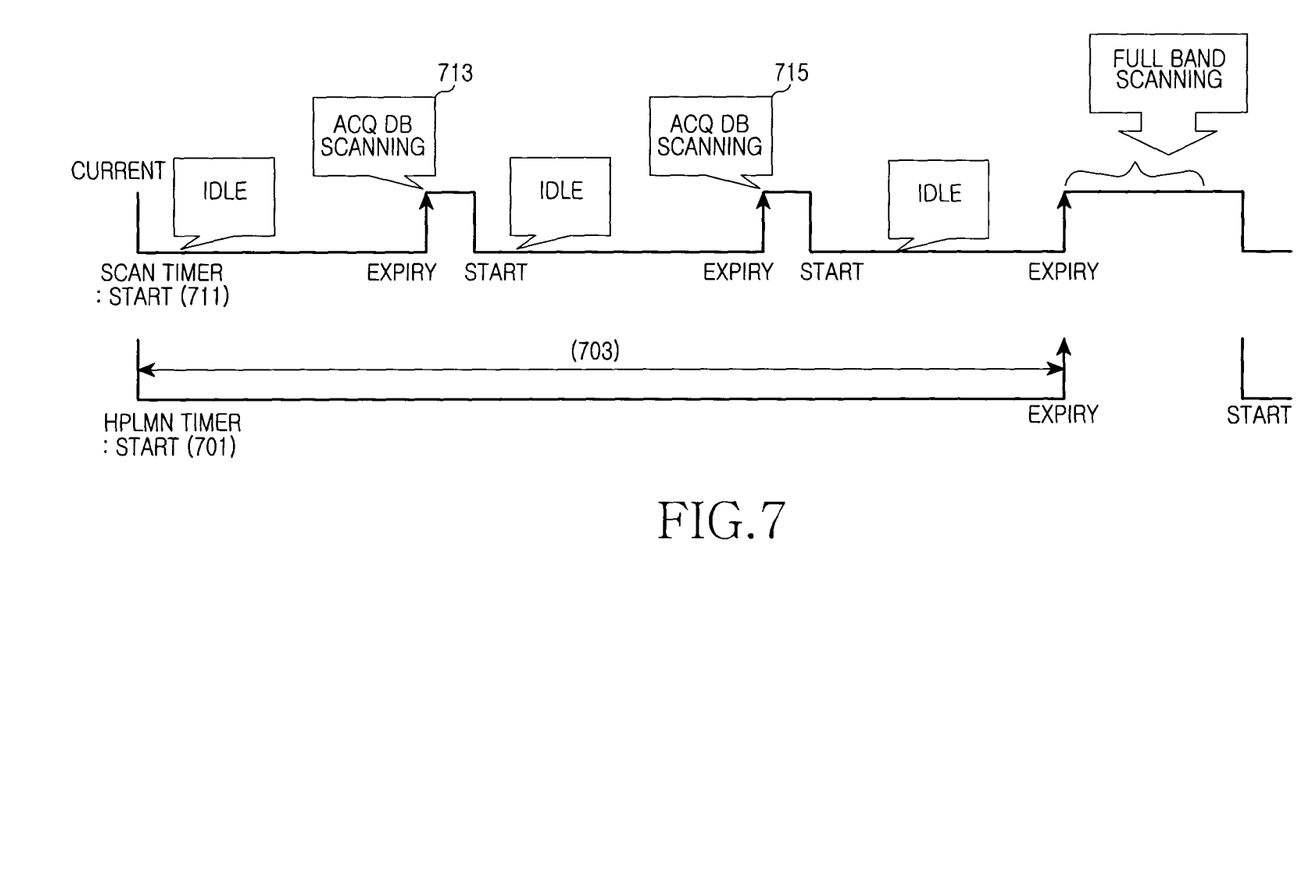

That is, as illustrated in FIG. 7, a determination time 703 of the HPLMN timer 701 configured based on the EF_HPPLMN stored in the SIM card is longer than a threshold, the mobile communication terminal may perform the scanning frequently (713, 715) by using a scan timer 711 of which determination time is shorter than the threshold.

This may prevent a situation that a time, which is required for the mobile communication terminal to move to a PLMN which has a higher priority, is delayed and an additional cost is required when the determination time 703 of the HPLMN timer 701 is configured longer than the threshold.

In the detailed description above, a method for scanning is determined by considering whether all the PLMNs included in the PLMN list are in the database. However, the mobile communication terminal in the present invention may determine the method for scanning by considering whether only PLMNs with higher priority than the PLMN, which the mobile communication terminal is currently registered to, out of PLMNs included in the PLMN list is included in the database or not.

That is, when all PLMNs with higher priority than the PLMN, which the mobile communication terminal is currently registered to, out of PLMNs included in the PLMN list are included in the database and PLMNs with lower priority than the PLMN, which the mobile communication terminal is currently registered to, are not included in the database, the mobile communication terminal may perform a scanning operation for only frequency bandwidths included in the database.

The purpose of the scanning is to scan PLMNs of higher priority than the PLMN which the mobile communication terminal is currently registered to. Thus, it is not required for the mobile communication terminal to scan PLMNs with lower priority than the PLMN which the mobile communication terminal is currently registered to.

The present invention performs a scanning operation of only frequency bandwidths included in the database or performs a scanning operation for all frequency bandwidths by comparing the pre-determined PLMNs with PLMNs of the configured PLMN list from the database, which stores frequency information, and by comparing the pre-determined PLMNs with PLMNs of a configured PLMN list from the SIM card in the mobile communication terminal.

Therefore, the present invention has advantages to minimize the current consumption and to scan networks within a short time. Also, the present invention has advantages to perform the scanning efficiently and to manage the database by determining whether to perform the entire scanning using an additional timer applying.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method in a mobile communication terminal, the method comprising:
    configuring a Public Land Mobile Network (PLMN) list based on at least one PLMN information stored in a Subscriber Identification Module (SIM) card, wherein the at least PLMN information include a Home Public Land Mobile Network (HPLMN) of the mobile communication terminal, a list of PLMNs and a priority for each PLMN; configuring a HPLMN timer and a scan timer based on an Elementary Files_Higher Priority PLMN (EF_HPPLMN) period stored in the SIM wherein the HPLMN timer period is longer than the scan timer period;
    detecting whether the mobile terminal is registered to a Visited Public Land Mobile Network (VPLMN);
    determining frequency information and corresponding PLMN information obtained from a previous scanning result stored in a database of the mobile communication terminal when the mobile communication terminal is registered to the VPLMN;
    comparing the determined frequency information and the corresponding PLMN information from the database with the PLMN list; and,
    performing a first scanning process when all PLMNs of the PLMN list are included in the database, wherein the first scanning process comprises periodic scanning of only frequency bandwidths included in the database for the HPLMN timer period; and performing a second scanning process for a first period of time when all PLMNs of the PLMN list; are not included in the database wherein the first period of time is longer than the HPLMN timer period and the second scanning process comprises:
    a first sub-scanning process including scanning of frequency bandwidths of the PLMN list included in the database in intervals of a second period of time upon each expiration of each instance of the scan timer until all the frequency bandwidths of the PLMN list are scanned or the HPLMN timer period expires; and
    a second sub-scanning process including scanning of remaining frequency bandwidths in the database not scanned in the first sub-scanning process for a third period of time,
wherein the first sub-scanning process and the second sub-scanning process are performed until a PLMN having a higher priority than a PLMN to which the mobile communication terminal is connected is detected.

2. The method of claim 1, wherein the PLMN list includes at least a PLMN identification (ID) and a priority of corresponding PLMNs in the list.

3. The method of claim 1, wherein the database includes a PLMN ID and corresponding frequency information of each PLMN.

4. The method of claim 1, further comprising;
determining whether a pre-determined first scanning period has expired;
performing, when the pre-determined first scanning period has expired, one of: the first scanning process and the second scanning process.

5. The method of claim 4, wherein the pre-determined first scanning period has a period which is determined by the EF_HPPLMN period stored in the SIM card.

6. The method of claim 4, further comprising;
determining the pre-determined first scanning period is longer than a threshold value; and,
performing the first sub-scanning process for a scanning period, which has a shorter period than the threshold value.

7. A mobile communication terminal, comprising;
a Subscriber Identification Module (SIM) storing Public Land Mobile Network (PLMN) identifiers (IDs) including a Home Public Land Mobile Network (HPLMN) of the mobile communication terminal, priority information and a pre-determined first scanning period information;
a storage unit storing a configured PLMN list from the SIM and a database storing frequency information and corresponding PLMN information by a scanning result; and,
a controller detecting whether the mobile terminal is registered to a Visited Public Land Mobile Network(VPLMN), determining frequency information and corresponding PLMN information obtained from a previous scanning result stored in the database of the mobile communication terminal when the mobile communication terminal is registered to the VPLMN, comparing the determined frequency information and corresponding PLMN information from the database with the PLMN list and performing a first scanning process when all PLMNs of the PLMN list are included in the database wherein the first scanning process comprises periodic scanning of only frequency bandwidths included in the database for the HPLMN timer period; and performing a second scanning process for a first period of time when all PLMNs of the PLMN list are not included in the database, wherein the first period of time is longer than the HPLMN timer period and the second scanning process comprises:
    a first sub-scanning process including scanning of frequency bandwidths of the PLMN list included in the database in intervals of a second period of time upon each expiration of each instance of the scan timer until all the frequency bandwidths of the PLMN list are scanned or the HPLMN timer period expires; and
    a second sub-scanning process of scanning remaining frequency bandwidths in the database not scanned in the first sub-scanning process for a third period of time,
wherein the first sub-scanning process and the second sub-scanning process are performed until a PLMN having a higher priority than a PLMN to which the mobile communication terminal is connected is detected.

8. The mobile communication terminal of claim 7, wherein the PLMN list includes at least a PLMN ID and a priority of corresponding PLMNs on the list.

9. The mobile communication terminal of claim 7, wherein the database includes a PLMN ID and corresponding frequency information of each PLMN.

10. The mobile communication terminal of claim 7, wherein the controller performs one of the first and the second scanning processes when the pre-determined first scanning period has expired.

11. The mobile communication terminal of claim 10, wherein the pre-determined first scanning period has a period which is determined by the EF_HPPLMN period stored in the SIM.

12. The mobile communication terminal of claim 10, wherein the controller controls an operation of determining the pre-determined first scanning period is longer than a threshold value, and
performing the first sub-scanning process for a scanning period, which is shorter than the threshold value.

* * * * *